(12) United States Patent
Daunch et al.

(10) Patent No.: US 6,884,825 B2
(45) Date of Patent: Apr. 26, 2005

(54) PROCESS FOR MAKING A FLEXIBLE POLYURETHANE FOAM

(75) Inventors: William Andrew Daunch, Uddingston (GB); Jan-Willem Leenslag, Tremelo (BE); Hans Godelieve Guido Verbeke, Lubbeek (BE)

(73) Assignee: Huntsman International LLC, Salt Lake City, UT (US)

( * ) Notice: Subject to any disclaimer, the term of this patent is extended or adjusted under 35 U.S.C. 154(b) by 198 days.

(21) Appl. No.: 10/336,315

(22) Filed: Jan. 3, 2003

(65) Prior Publication Data

US 2003/0158280 A1 Aug. 21, 2003

Related U.S. Application Data

(63) Continuation of application No. PCT/EP01/07706, filed on Jul. 5, 2001.

(51) Int. Cl.[7] .............................................. C08G 18/28
(52) U.S. Cl. ........................ 521/174; 521/130; 521/137; 521/170
(58) Field of Search ................................ 521/130, 137, 521/170, 174

(56) References Cited

U.S. PATENT DOCUMENTS

| | | | |
|---|---|---|---|
| 4,506,040 A | | 3/1985 | Raes et al. |
| 5,521,226 A | * | 5/1996 | Bleys .......................... 521/174 |
| 5,597,885 A | | 1/1997 | Lutter et al. |
| 5,919,395 A | * | 7/1999 | Bastin et al. ........... 252/182.24 |
| 6,417,241 B1 | | 7/2002 | Huygens et al. |

FOREIGN PATENT DOCUMENTS

| | | |
|---|---|---|
| DE | 31 25 402 | 1/1983 |
| EP | 188 766 | 7/1986 |
| EP | 418 039 | 3/1991 |
| EP | 0 418 039 | 3/1991 |
| EP | 555 721 | 8/1993 |
| EP | 0 555 721 | 8/1993 |
| GB | 2329642 | 3/1999 |
| WO | WO 96/35744 | 11/1996 |
| WO | WO 00/08083 | 2/2000 |
| WO | WO 00/73362 | 12/2000 |
| WO | WO 01/53370 | 7/2001 |

OTHER PUBLICATIONS

R.D. Priester, Jr. et al., "High Resiliency Polyurea Foam—An Improved Flexible Foam Matrix", Journal of Cellular Plastics, Mar. 1994, p. 144, vol. 30, Technomic Publishing Co., Inc.

D.R. Gier et al., "Fillers, Hard Phases and Copolymer Polyols—Their Different Mechanism to Reinforce Flexible Polyurethane Foams", Polyurethanes Expo '98, Sep. 17–20, 1998, p. 227.

J.P. Armistead et al., "Morphology of Water–Blown Flexible Polyurethane Foams", Journal of Applied Polymer Science, 1988, 601–629, vol. 35, John Wiley & Sons, Inc.

* cited by examiner

Primary Examiner—John M. Cooney, Jr.
(74) Attorney, Agent, or Firm—Nicole Graham (57) ABSTRACT

Process for preparing a flexible polyurethane foam comprising reacting at an isocyanate index of 70 to 130, 1) 40–65 parts by weight of a polyisocyanate composition comprising a) 80–100% by weight of a diphenylmethane diisocyanate component comprising, based on 100 parts by weight of the diphenylmethane diisocyanate component, i) 75–100 parts by weight of diphenylmethane diisocyanate comprising 15–75 parts by weight of 4,4'-diphenylmethane diisocyanate, and 25 to 85 parts by weight of 2,4'-diphenylmethane diisocyanate, and 2,2'-diphenylmethane diisocyanate and/or a liquid variant of such diphenylmethane diisocyanate, and ii) 0 to 25 parts by weight of homologues of diphenylmethane diisocyanates having an isocyanate functionality of 3 or more; and b) 20–0% by weight of toluene diisocyanate; 2) 20 to 45 parts by weight of a polyether polyol having an average molecular weight of 4500–10000, an average nominal functionality of 2–6 and comprising oxypropylene and optionally oxyethylene groups, the amount of oxypropylene groups being at least 70% by weight calculated on the weight of this polyol; 3) 3 to 20 parts by weight of a polyether polyol having an average molecular weight of 700–4000, an average nominal functionality of 2–6 and an hydroxyl value of at most 225 mg KOH/g and comprising oxyethylene and optionally oxypropylene groups, the amount of oxyethylene groups being at least 70% by weight calculated on the weight of this polyol; and 4) 2–6 parts by weight of water, wherein the amount of the polyisocyanate composition, polyol 2), polyol 3), and water being 100 parts by weight.

32 Claims, 6 Drawing Sheets

Figure 6

PROCESS FOR MAKING A FLEXIBLE POLYURETHANE FOAM

CROSS REFERENCE TO RELATED APPLICATIONS

This application is a continuation of international application PCT EP01/07706, filed Jul. 5, 2001.

FIELD OF THE INVENTION

The present invention is related to a process for preparing a flexible polyurethane foam and to flexible polyurethane foams.

BACKGROUND OF THE INVENTION

Processes for preparing a flexible polyurethane foam by reacting a polyisocyanate, one or more polyether polyols, and water have been described widely. One of the disadvantages of the prior art processes is that the blowing efficiency is not optimal. This means that either part of the water used does not react with the polyisocyanate and hence no $CO_2$ is liberated or the $CO_2$ is liberated too early and leaves the reacting mixture without effectively contributing to the foam expansion. Therefore, the density is often not as low as it could be. Another disadvantage is that at high stoichiometric water levels the foam properties such as hysteresis and related compression set properties deteriorate. Further, flexible polyurethane foams so prepared often do not have sufficient load-bearing properties. In order to provide such foams with enhanced load-bearing properties, often polyols are used that contain particulate materials dispersed therein. Examples of such polyols are so-called SAN-based polymer polyols, PIPA-polyols, and PHD-polyols. If the particulate material has particles with a rather big average particle size, often foam collapse is observed.

The formation of relatively small (up to 0.3 $\mu$m) urea aggregates in flexible polyurethane foam preparation in itself is known; see Journal of Applied Polymer Science, Vol. 35, 601–629 (1988) by J. P. Armistead et al. and Journal of Cellular Plastics, Vol. 30, page 144, (March 1994) by R. D. Priester et al. Until recently it was believed that by increasing the urea hard phase content other important properties like resiliency, hysteresis and compression set will suffer; see Polyurethanes Expo '98, 17–20 Sep. 1998, page 227 by D. R. Gier et al.

SUMMARY OF THE INVENTION

Surprisingly, it has been found that by a proper selection of ingredients which as such are known for their use in flexible polyurethane foams and by using these ingredients in special relative amounts, in particular using a relatively high amount of polyisocyanate, the foam density may be lowered and foams are obtainable with good load-bearing properties, even if no polyol is used which contains dispersed particulate material. Further, such foams show good recovery properties such as compression set. It was found that during reaction of the polyisocyanate, the polyols and the water, spontaneously urea and urethane containing particulate material is formed, which, once the foam has been prepared, is predominantly located in the struts of the foam, although no particulate material was present in the ingredients used for preparing the foams; preferably at least 80% of the particulate material is located in the struts, more preferably at least 90% by weight of the particulate material is in the struts. This in-situ formed particulate material may have a relatively large average particle size and comprises urea and urethane groups.

Therefore, the present invention is concerned with a process for preparing a flexible polyurethane foam comprising reacting at an isocyanate index of 70 to 130, preferably 80–120, most preferably 100–115, 1) 40–65 and preferably 45–63 parts by weight of a polyisocyanate composition (polyisocyanate 1) comprising a) 80–100% by weight of a diphenylmethane diisocyanate (MDI) component comprising, based on 100 parts by weight of the MDI component, 1) 75–100 and preferably 85–100 parts by weight of diphenylmethane diisocyanate comprising 15–75, preferably 25–75 and most preferably 30 to 70 parts by weight of 4,4'-diphenylmethane diisocyanate, and 25 to 85, preferably 25 to 75 and most preferably 30 to 70 parts by weight of 2,4'-MDI, and 2,2'-MDI, and/or a liquid variant of such diphenylmethane diisocyanate, and 2) 0 to 25 and preferably 0–15 parts by weight of homologues of diphenylmethane diisocyanates having an isocyanate functionality of 3 or more; and b) 20–0% by weight of toluene diisocyanate;

2) 20 to 45, preferably 20–40 parts by weight of a polyether polyol (polyol 2) having an average molecular weight of 4500–10000, an average nominal functionality of 2–6 and preferably 2–4 and comprising oxypropylene and optionally oxyethylene groups, the amount of oxypropylene groups being at least 70% by weight calculated on the weight of this polyol;

3) 3 to 20 parts by weight of a polyether polyol (polyol 3) having an average molecular weight of 700–4000 and preferably of 1000–2000, an average nominal functionality of 2–6 and an hydroxyl value of at most 225 mg KOH/g and comprising oxyethylene and optionally oxypropylene groups, the amount of oxyethylene groups being at least 70% by weight calculated on the weight of this polyol; and 4) 2–6 parts by weight of water, the amount of polyisocyanate 1), polyol 2), polyol 3) and water being 100 parts by weight.

DETAILED DESCRIPTION OF THE INVENTION

Surprisingly, it has been found that by a proper selection of ingredients which as such are known for their use in flexible polyurethane foams and by using these ingredients in special relative amounts, in particular using a relatively high amount of polyisocyanate, the foam density may be lowered and foams are obtainable with good load-bearing properties, even if no polyol is used which contains dispersed particulate material. Further, such foams show good recovery properties such as compression set. It was found that during reaction of the polyisocyanate, the polyols and the water, spontaneously urea and urethane containing particulate material is formed, which, once the foam has been prepared, is predominantly located in the struts of the foam, although no particulate material was present in the ingredients used for preparing the foams; preferably at least 80% of the particulate material is located in the struts, more preferably at least 90% by weight of the particulate material is in the struts. This in-situ formed particulate material may have a relatively large average particle size and comprises urea and urethane groups.

Therefore, the present invention is concerned with a process for preparing a flexible polyurethane foam comprising reacting at an isocyanate index of 70 to 130, preferably 80–120, most preferably 100–115, 1) 40–65 and preferably 45–63 parts by weight of a polyisocyanate composition (polyisocyanate 1) comprising a) 80–100% by weight of a diphenylmethane diisocyanate (MDI) component comprising, based on 100 parts by weight of the MDI component, 1) 75–100 and preferably 85–100 parts by weight of diphenylmethane diisocyanate comprising 15–75, preferably 25–75 and most preferably 30 to 70 parts by weight of 4,4'-diphenylmethane diisocyanate, and 25 to 85, preferably 25 to 75 and most preferably 30 to 70 parts by weight of 2,4'-MDI, and 2,2'-MDI, and/or a liquid variant of such diphenylmethane diisocyanate, and 2) 0 to 25 and preferably 0–15 parts by weight of homologues of diphenylmethane diisocyanates having an isocyanate functionality of 3 or more; and b) 20–0% by weight of toluene diisocyanate;
2) 20 to 45, preferably 20–40 parts by weight of a polyether polyol (polyol 2) having an average molecular weight of 4500–10000, an average nominal functionality of 2–6 and preferably 2–4 and comprising oxypropylene and optionally oxyethylene groups, the amount of oxypropylene groups being at least 70% by weight calculated on the weight of this polyol;
3) 3 to 20 parts by weight of a polyether polyol (polyol 3) having an average molecular weight of 700–4000 and preferably of 1000–2000, an average nominal functionality of 2–6 and an hydroxyl value of at most 225 mg KOH/g and comprising oxyethylene and optionally oxypropylene groups, the amount of oxyethylene groups being at least 70% by weight calculated on the weight of this polyol; and 4) 2–6 parts by weight of water, the amount of polyisocyanate 1), polyol 2), polyol 3) and water being 100 parts by weight.

The in-situ formed particulate material behaves differently from the particulate material used traditionally in polyols like "polymer polyols", "SAN polymer polyol", "PHD polyols" and "PIPA polyols": upon tearing the foam according to the invention under ambient conditions the in-situ formed particulate material fractures along the tear and the particulate material is cleaved at the fracture surface of the foam struts (as can be seen by scanning electron microscopy) while the traditional particulate material does not. Therefore, the present invention is further concerned with a flexible polyurethane foam comprising particulate material, which material fractures by tearing the foam. Still further, the present invention is concerned with flexible polyurethane foams comprising in situ formed particulate material comprising urea and urethane groups.

The average particle size of the particles may vary widely from 0.1–20 μm. Preferably, the average particle size is 2–20 μm, more preferably 2.5–15 μm and most preferably 3–10 μm. The particulate material preferably is predominantly located in the struts of the flexible foam; more preferably at least 80 volume % of the particulate material is located in the struts; most preferably this figure is at least 90 volume %.

The volume fraction (% v) of the particulate material in the foam based on the volume of the solid part of the foam is at least 10% v and preferably at least 15% v and most preferably 15–40% v.

The flexible polyurethane foams preferably have a free rise core density of 5–80, more preferably of 6–50 and most preferably of 8–35 kg/M$^3$, measured according to ISO/DIS 845. Further, the flexible foams according to the present invention preferably have a ratio of the Young's storage modulus E' at −100° C. over the Young's storage modulus at +25° C. of more than 15 (measured via Dynamic Mechanical Thermal Analysis according to ISO/DIS 6721-5).

In the context of the present invention the following terms have the following meaning:
1) isocyanate index or NCO index or index: the ratio of NCO-groups over isocyanate-reactive hydrogen atoms present in a formulation, given as a percentage:

[NCO×100]/[Active hydrogen](%).

In other words, the NCO-index expresses the percentage of isocyanate actually used in a formulation with respect to the amount of isocyanate theoretically required for reacting with the amount of isocyanate-reactive hydrogen used in a formulation. It should be observed that the isocyanate index, as used herein, is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.
2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.
3) Reaction system: a combination of components wherein the polyisocyanates are kept in one or more containers separate from the isocyanate-reactive components.
4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.
5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

7) Particle size of the particulate material is defined as the number average diameter and is measured by fluorescent microscopy of microtomed sections of resin-embedded foam samples and determined by the automated image analysis protocol based on the principles of stereology described by E. Underwood in Quantitative Stereology 1970, chapter 6.4.4, FIG. 6.6.c, edited by Addison-Wesley Publishing Company. The volume fraction of the particulate material based on the volume of the solid part of the foam is determined likewise. The amount (on a volume basis) of particulate material in the struts based on the total amount of particulate material in the foam is determined by Brightfield Microscopy with refractive index matching.

The diphenylmethane diisocyanate may be selected from isomeric mixtures of 4,4'-MDI, 2,4'-MDI and 2,2'-MDI in the indicated amounts, from liquid variants thereof, mixtures thereof and mixtures of such isomeric mixtures with one or more liquid variants of one or more of the constituents of these isomeric mixtures. A liquid variant is defined as being liquid at 25° C. and as being obtained by introducing uretonimine and/or carbodiimide groups into said polyisocyanates, such a carbodiimide and/or uretonimine modified polyisocyanate having an NCO value of at least 20% by weight, and/or by reacting such a polyisocyanate with one or more polyols having a hydroxyl functionality of 2–6 and a molecular weight of 62–500 so as to obtain a modified polyisocyanate having an NCO value of at least 20% by weight.

The MDI component may comprise homologues of diphenylmethane diisocyanate having an isocyanate functionality of 3 or more. This is achieved by mixing any of the aforementioned diphenylmethane diisocyanates with polymeric or crude MDI in appropriate ratios so as to obtain an MDI component with the indicated amounts of 4,4'-MDI, 2,4'-MDI and 2,2'-MDI, and homologues having a functionality of 3 or more. Polymeric or crude MDI comprise MDI and homologues having an isocyanate functionality of 3 or more and are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.1–2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation.

The amount of 2,2'-MDI in most commercially available polyisocyanates based on MDI and/or polymeric or crude MDI is low; generally the amount is below 5% and often lower than 2% by weight. Therefore, it is to be understood that the amount of 2,2'-MDI in the above MDI component is low, generally below 5% and preferably below 2% by weight.

An example of an MDI component according to the present invention is a mixture of 85% by weight of MDI comprising 50% by weight of 4,4'-MDI and 50% by weight of 2,4'-MDI and 2,2'-MDI and 15% by weight of a polymeric MDI comprising about 35 pbw of 4,4'-MDI, 2 pbw of 2,2'-+2,4'-MDI and 63 pbw of homologues having an isocyanate of 3 or more (on 100 pbw of polymeric MDI). If desired up to 20% by weight of toluene diisocyanate (TDI), calculated on the total weight of the polyisocyanate composition, may be used. The TDI used may be 2,4-TDI, 2,6-TDI or mixtures thereof.

Polyol 2 may be selected from those known in the art. The polyol 2 may be a single polyol or a mixture of polyols meeting the restrictions as to molecular weight, nominal functionality and oxypropylene group content. The polyol 2 may be a polyoxypropylene polyol or a polyoxypropylene polyoxyethylene polyol having an oxypropylene group content of at least 70% by weight. The oxyethylene groups in such polyols may be distributed over the polymer chain of such polyol in random or block form or combinations thereof. A particularly preferred polyol is a polyoxypropylene polyoxyethylene polyol wherein all oxyethylene groups are at the end of the polymer chain (so called EO-capped polyols); especially those comprising 10–25% by weight of oxyethylene groups at the end of the polymer chains, the remainder of the oxyalkylene groups being oxypropylene groups. Such polyols are widely known commercially; examples are ARCOL™ 1374 polyol (Lyondell) and DALTOCEL™ F428 and F435 polyol (Huntsman International LLC).

Polyol 3 may be selected from those known in the art. Polyol 3 may be a single polyol or a mixture of polyols meeting the restrictions as to molecular weight, nominal functionality, hydroxyl value and oxyethylene group content. Polyol 3 may be a polyoxyethylene polyol or polyoxyethylene polyoxypropylene polyol having a polyoxyethylene group content of at least 70% by weight. The oxypropylene groups in such polyols may be distributed over the polymer chain of such polyol in random or block form or combinations thereof. Most preferably, polyoxyethylene polyols having an average molecular weight of 1000–2000, an hydroxyl value of at most 145 mg KOH/g and an average nominal functionality of 2–4 are used. Examples of suitable polyols are polyoxyethylene glycol having a molecular weight of 1000–2000, G2005 (Uniqema) and DALTOCEL™ F526 polyol (Huntsman International LLC).

Polyol 2 and polyol 3 include reaction products of propylene oxide and optionally ethylene oxide on the one hand and of ethylene oxide and optionally propylene oxide on the other hand, with initiators containing from 2 to 6 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine; and mixtures of such initiators.

Water is used as the sole blowing agent.

As stated before, in the process of the present invention particulate material is formed in-situ and therefore there is no need to have particulate material in the ingredients used for making the foam. However, if desired e.g. for processing reasons or for additional reinforcement such particulate material may be used and therefore polyol 2 and/or polyol 3 may contain particulate material; preferably polyol 2 contains the particulate material. Such modified polyols often referred to as "polymer" polyols have been fully described in the prior art and include products obtained by the polymerisation of one or more vinyl monomers, for example styrene and acrylonitrile, in polyether polyols, or by the reaction between a polyisocyanate and an amino- or hydroxy-functional compound, such as triethanolamine, in a polyether polyol. The polymer modified polyols which are particularly interesting in accordance with the invention are products obtained by polymerisation of styrene and/or acrylonitrile in polyoxyethylene polyoxypropylene polyols and products obtained by reaction between a polyisocyanate and an amino or hydroxy-functional compound (such as triethanolamine) in a polyoxyethylene polyoxypropylene polyol. Polyoxyalkylene polyols containing from 5 to 50% of dispersed polymer are particularly useful.

In addition to the polyisocyanate, the polyols 2) and 3) and the water, one or more auxiliaries or additives known per se for the production of polyurethane foams may be used. Such optional auxiliaries or additives include chain extenders and/or cross-linkers; catalysts like tin compounds, such as stannous octoate and/or dibutyltin dilaurate, and/or tertiary amines, such as dimethylcyclohexylamine and/or triethylene diamine, and/or phosphates like $NaH_2PO_4$ and/or $Na_2HPO_4$ and polycarboxylic acids, like citric acid, ethylene diamine tetra acetic acid and salts thereof; foam-stabilizing agents or surfactants, for example siloxane-oxyalkylene copolymers and polyoxyethylene polyoxypropylene block copolymers; fire retardants, for example halogenated alkyl phosphates such as tris chloropropyl phospate, melamine, expanded graphite, bromine-containing compounds and guanidine carbonate, anti-oxidants, UV stabilizers, anti-microbial and anti-fungal compounds and fillers like latex, TPU, silicates, barium and calcium sulphates, chalk, glass fibres or beads and polyurethane waste material. Chain extenders and cross-linkers may be selected from those isocyanate-reactive compounds known in the art for that purpose like polyamines, aminoalcohols and polyols. Of particular importance for the preparation of the foams are polyols and polyol mixtures having hydroxyl numbers of more than 225 mg KOH/g and an average nominal hydroxyl functionality of from 2 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixture of such initiators. Other suitable polyols include polyesters obtained by the condensation of appropriate proportions of glycols and higher functionality polyols with polycarboxylic acids. Still further suitable polyols include hydroxyl terminated polythioethers, polyamines, polyesteramides, polycarbonates, polyacetals, polyolefins and polysiloxanes.

Still further suitable isocyanate-reactive compounds include ethylene glycol, diethylene glycol, propylene glycol, dipropylene glycol, butane diol, glycerol, trimethylolpropane, ethylene diamine, ethanolamine, diethanolamine, triethanolamine and the other initiators mentioned before. Mixtures of such isocyanate-reactive compounds may be used as well. The amount of chain extender and/or cross linker in general will be less than 10% by weight calculated on the amount of polyol 2) and polyol 3); preferably this is at most 8% by weight.

The reaction of the polyisocyanate with polyol 2, polyol 3, the water and optionally the chain-extender and/or cross-linker is conducted at an isocyanate index of 70 to 130, and preferably of 80–120, and most preferably this index is 100 to 115.

In operating the process for making the foams according to the invention, the known one-shot, prepolymer or semi-prepolymer techniques may be used together with conventional mixing methods and the foam may be produced in the form of free-rise foam, slabstock, mouldings including foam in fabric and pour-in-place applications, sprayed foam, frothed foam or laminates with other materials such as hardboard, plasterboard, plastics, paper or metal or with other foam layers. Because the flow of the ingredients is relatively good, these are in particular suitable for making moulded flexible polyurethane foams, minimizing the amount of overpack required.

It is convenient in many applications to provide the components for polyurethane production in pre-blended formulations based on each of the primary polyisocyanate and isocyanate-reactive components. In particular, an isocyanate-reactive composition may be used which contains the auxiliaries, additives and the blowing agent in addition to the isocyanate-reactive compounds (2) and (3) in the form of a solution, an emulsion or dispersion. This composition is than mixed with the polyisocyanate in order to prepare a foam according to the present invention.

The foam is prepared by allowing the aforementioned ingredients to react and foam until the foam does not rise any more. Subsequently, the foam may be crushed.

The foams according to the present invention show good load-bearing properties like compression hardness values without the use of external fillers together with a good resilience, tear strength and durability (fatigue resistance) even at very low densities. In conventional flexible foams often high amounts of filler need to be used to obtain satisfactory loadbearing properties. Such high amounts of fillers hamper the processing due to a viscosity increase of the polyol.

The foams of the present invention may be used as cushioning material in furniture and automotive seating and in mattresses, as carpet backing, as hydrophilic foam in diapers, as packaging foam, as foams for sound insulation in automotive applications and for vibration isolation in general.

Another aspect of the invention is that because the amount of aromatic polyisocyanate and more in particular of MDI and polymethylene polyphenylene polyisocyanate used to prepare the foam is rather high, the content of cyclic and more in particular of aromatic residues in the flexible foam is relatively high as compared to conventional flexible polyurethane foams. The foams according to the invention preferably have a content of benzene rings, derived from aromatic polyisocyanates, which is 20 to 40 and most preferably 25 to less than 35% by weight based on the weight of the foam. Because polyols, polymer polyols, fire retardants, chain extenders and/or fillers, which contain benzene rings, may be used, the overall benzene ring content of the flexible foam may be higher and preferably ranges from 20 to 55, and most preferably from 25 to 50% weight as measured by calibrated Fourier Transform Infrared Analysis.

The invention is illustrated by the following non-limiting examples.

EXAMPLES

Example 1

A polyisocyanate composition was prepared by mixing 84.3 parts by weight of MDI comprising 50% by weight of 4.4'-MDI and 50% by weight of 2,4'+2,2'-MDI and 15.7 parts by weight (pbw) of a polymeric MDI having an NCO value of 30.7% by weight and comprising 35.4 pbw of 4,4'-MDI, 2.3 pbw of 2,4'+2,2'-MDI and 62.3 pbw of homologues having an isocyanate functionality of 3 or more.

A polyol composition was prepared by mixing 36.2 pbw of ARCOL 1374 polyol, 9.4 pbw of DALTOCEL F526 polyol, 2.9 pbw of water, 0.24 pbw of EPK-38-1 (a surfactant sold by Goldschmidt), 0.34 pbw of a mixture of IRGANOX 1135 anti-oxydants and IRGAFOS TNPP anti-oxydants (50/50, w/w), both from Ciba.

The polyisocyanate composition (49.8 pbw) and the polyol composition (50.3 pbw) were mixed and allowed to react under free-rise conditions, the isocyanate index was 105. The foam obtained was a flexible polyurethane foam containing particulate material comprising urethane and urea groups as determined by inspection of the amide-I region via Infrared Microscopy Analysis using a high powered source and the foam had the following physical properties:

|  | | Method of measurement |
|---|---|---|
| free rise core density, kg/m³ | 20 | ISO/DIS 845 |
| compression set at 70° C. -dry, % | 15 | ISO 1856 |
| compression load deflection at 40% compression, kPa | 1.4 | ISO 3386/1 |
| average particle diameter of particulate material, μm | 3.9 | see before |
| volume fraction of particulate material based on volume of the solid part of the foam, % v | 20 | see before |
| amount of particulate material in the struts based on the amount of particulate material in the foam, % v | >90 | see before |

Example 2

Scanning Electron Microscopy images were made of foams made from PIPA polyol, PHD polyol and from ingredients according to the present invention. Pictures show the following:

| Figure | Scale bar (μm) | Foam |
|---|---|---|
| 1 | 20 | invention |
| 2 | 5 | invention |
| 3 | 20 | PIPA |
| 4 | 5 | PIPA |

Figure 5:
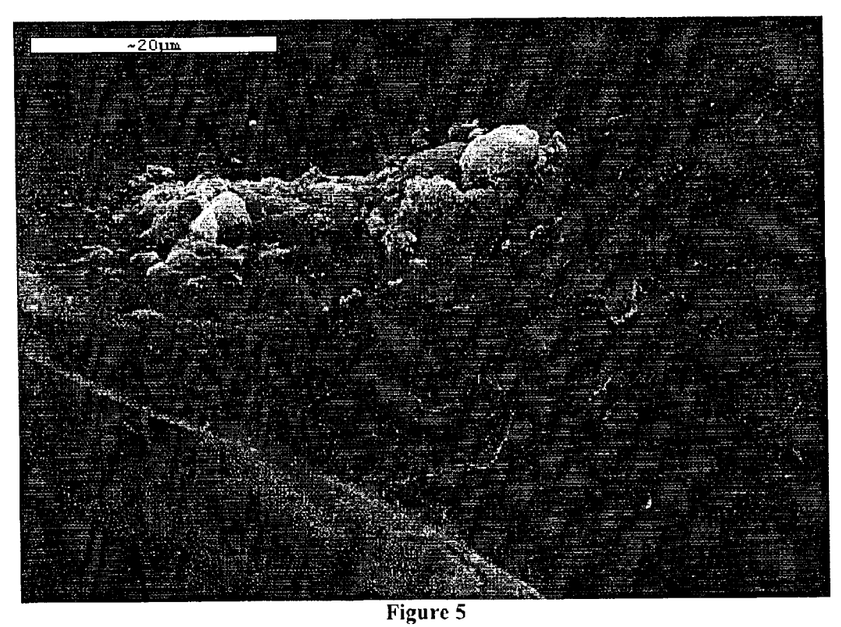
FIG. 5 is a scanning electron microscope image of a foam made using a PHD polyol.
Figure 6:
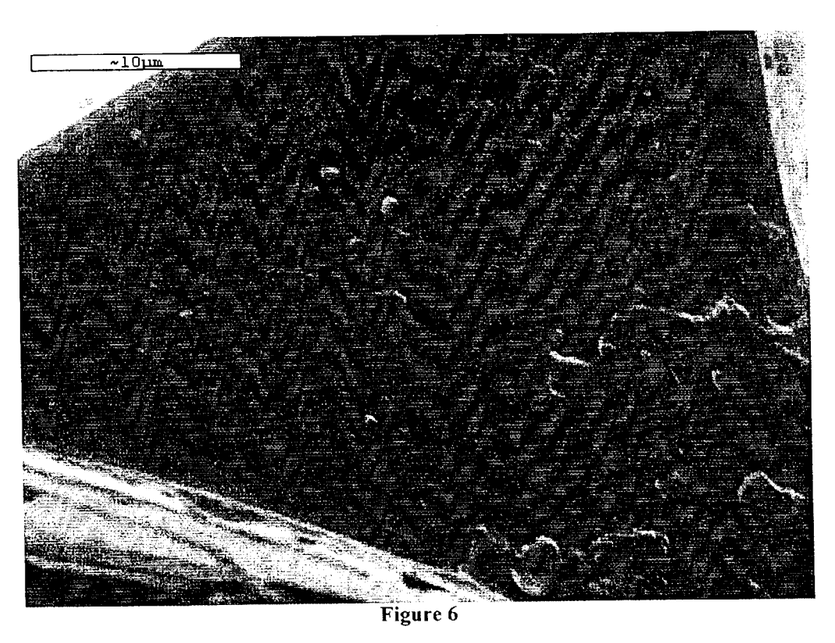
FIG. 6 is a scanning electron microscope image of a foam made using a PHD polyol.

| Figure | Scale bar (μm) | Foam |
|---|---|---|
| 5 | 20 | PHD |
| 6 | 10 | PHD |

Figure 1:
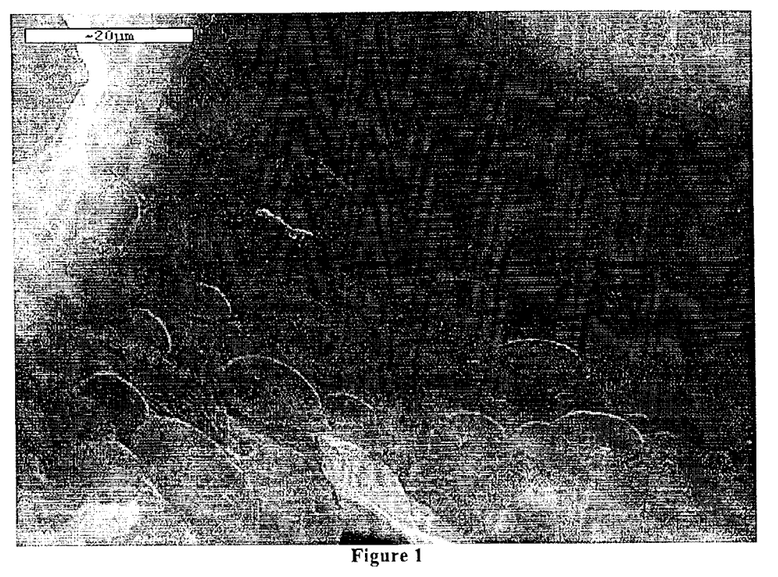
FIG. 1 is a scanning electron microscope image of a foam made according to the invention.
Figure 2:
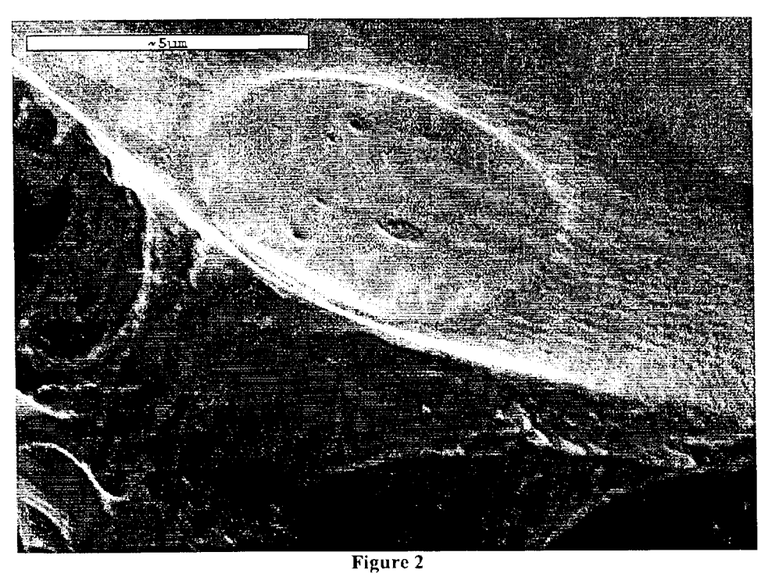
FIG. 2 is a scanning electron microscope image of a foam made according to the invention.
Figure 3:
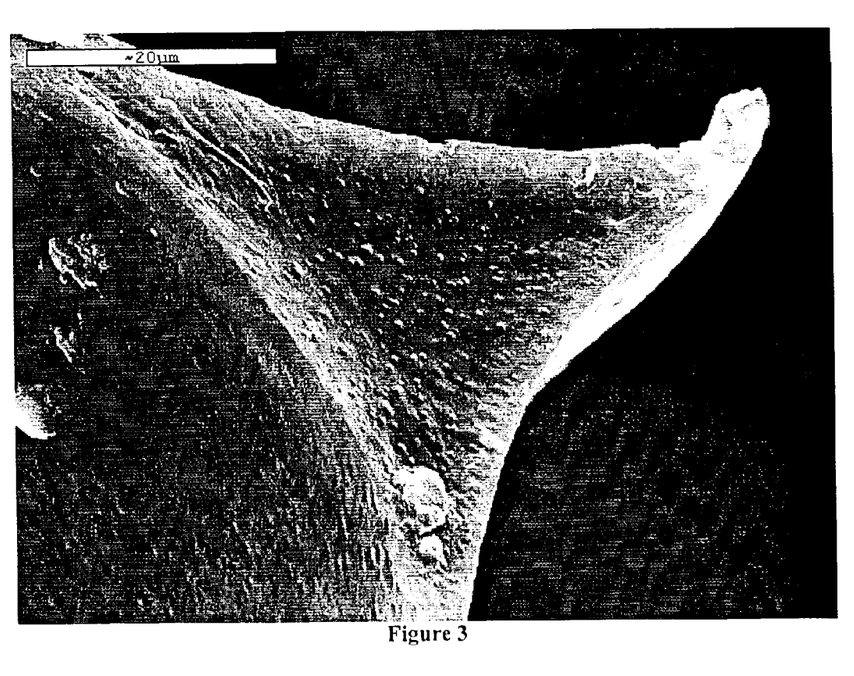
FIG. 3 is a scanning electron microscope image of a foam made using a PIPA polyol.
Figure 4:
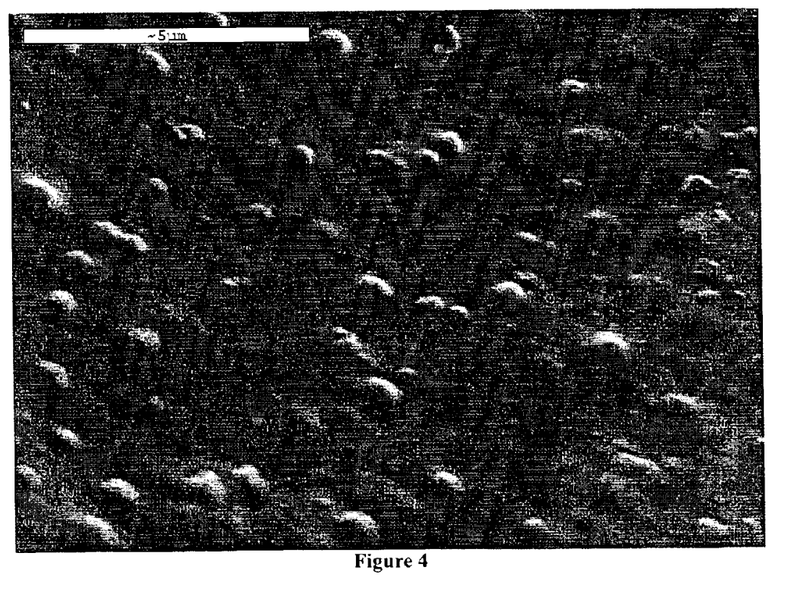
FIG. 4 is a scanning electron microscope image of a foam made using a PIPA polyol.

First of all the difference in particle size is noticeable (compare FIGS. 1, 3 and 5). In FIG. 1, big particles with clear boundaries are visible; in FIG. 3 the particles are much smaller and in FIG. 5 the boundaries are not so clear and the PHD material seems to form conglomerates with not sharply defined boundaries. Secondly, FIGS. 1 and 2 nicely show the particles cleaved at the fracture surface of the foam struts. FIGS. 3–6 show particulate material, which did not cleave.

Example 3

58 pbw of DALTOCEL F428 polyol, 30 pbw of polyol X, 12 pbw of DALTOCEL F526 polyol, 7 pbw of water, 1.2 pbw of B4113 (a surfactant from Goldschmidt), 0.6 pbw of D8154 (an amine catalyst from Air Products), 0.1 pbw of NIAX A1 catalyst (from Union Carbide) and 0.3 pbw of D33 LV (a catalyst from Air Products) where mixed in an open bucket of 101. To this was added 110 pbw of a mixture of the MDI and polymeric MDI used in example 1 in a weight ratio of 4:1. The index was 100. This mixture was allowed to react. A flexible polyurethane was obtained having open cells and a free rise density of 19 kg/m³.

Polyol X is an polyoxyethylene polyoxypropylene polyol having a nominal functionality of 3, an average equivalent weight of about 2000, having an EO content of 28% by weight, an EO-capped content of 15% by weight and the remainder of the EO being randomly distributed with the PO; the primary hydroxyl content is about 85% and the monool content is about 12% mole.

What is claimed:

1. A process for preparing a flexible polyurethane foam comprising reacting at an isocyanate index of 70 to 130:
   1) 40–65 parts by weight of a polyisocyanate composition comprising:
      a) 80–100% by weight of a diphenylmethane diisocyanate component comprising, based on 100 parts by weight of the diphenylmethane diisocyanate component:
         i) 75 to 100 parts by weight of diphenylmethane diisocyanate comprising 15–75 parts by weight of 4,4'-diphenylmethane diisocyanate, and 25 to 85 parts by weight of 2,4'-diphenylmethane diisocyanate, and 2,2'-diphenylmethane diisocyanate and/or a liquid variant of such diphenylmethane diisocyanate, and
         ii) 0 to 25 parts by weight of homologues of diphenylmethane diisocyanates having an isocyanate functionality of 3 or more; and
      b) 20–0% by weight of toluene diisocyanate;
   2) 20 to 45 parts by weight of a polyether polyol having an average molecular weight of 4500–10000, an average nominal functionality of 2–6 and comprising oxypropylene and optionally oxyethylene groups, the amount of oxypropylene groups being at least 70% by weight calculated on the weight of this polyol;
   3) 3 to 20 parts by weight of a polyether polyol having an average molecular weight of 700–4000, an average nominal functionality of 2–6 and an hydroxyl value of at most 225 mg KOH/g and comprising oxyethylene and optionally oxypropylene groups, the amount of oxyethylene groups being at least 70% by weight calculated on the weight of this polyol; and 4) 2–6 parts by weight of water, wherein, the amount of the polyisocyanate composition, the polyether polyol 2), the polyether polyol 3), and water being 100 parts by weight.

2. The process of claim 1, wherein the polyether polyol 3) has an hydroxyl value of at most 145 mg KOH/g.

3. The process of claim 1, wherein the polyether polyol 3) has a molecular weight of 1000–2000.

4. The process of claim 2, wherein the polyether polyol 3) has a molecular weight of 1000–2000.

5. The process of claim 1, wherein the foam has a ratio of the Young's storage modulus E' at −100° C. over the Young's storage modulus at +25° C. of more than 15.

6. The process of claim 2, wherein the foam has a ratio of the Young's storage modulus E' at −100° C. over the Young's storage modulus at +25° C. of more than 15.

7. The process of claim 3, wherein the foam has a ratio of the Young's storage modulus E' at −100° C. over the Young's storage modulus at +25° C. of more than 15.

8. The process of claim 4, wherein the foam has a ratio of the Young's storage modulus E' at −100° C. over the Young's storage modulus at +25° C. of more than 15.

9. A process for preparing a flexible polyurethane foam comprising reacting at an isocyanate index of 100 to 115:

1) 45–63 parts by weight of a polyisocyanate composition comprising:
   a) 80–100% by weight of a diphenylmethane diisocyanate component comprising, based on 100 parts by weight of the diphenylmethane diisocyanate component:
      i) 85 to 100 parts by weight of diphenylmethane diisocyanate comprising 30–70 parts by weight of 4,4'-diphenylmethane diisocyanate, and 30 to 70 parts by weight of 2,4'-diphenylmethane diisocyanate, and 2,2'-diphenylmethane diisocyanate and/or a liquid variant of such diphenylmethane diisocyanate, and
      ii) 0 to 15 parts by weight of homologues of diphenylmethane diisocyanates having an isocyanate functionality of 3 or more; and
   b) 20–0% by weight of toluene diisocyanate;

2) 20 to 40 parts by weight of a polyether polyol having an average molecular weight of 4500–10000, an average nominal functionality of 2–4 and comprising oxypropylene and optionally oxyethylene groups, the amount of oxypropylene groups being at least 70% by weight calculated on the weight of this polyol;

3) 3 to 20 parts by weight of a polyether polyol having an average molecular weight of 1000–2000, an average nominal functionality of 2–6 and an hydroxyl value of at most 225 mg KOH/g and comprising oxyethylene and optionally oxypropylene groups, the amount of oxyethylene groups being at least 70% by weight calculated on the weight of this polyol; and 4) 2–6 parts by weight of water, wherein, the amount of the polyisocyanate composition, the polyether polyol 2), the polyether polyol 3), and water being 100 parts by weight.

10. The process of claim 9, wherein the polyether polyol 3) has an hydroxyl value of at most 145 mg KOH/g.

11. The process of claim 9, wherein the polyether polyol 3) has a molecular weight of 1000–2000.

12. The process of claim 10, wherein the polyether polyol 3) has a molecular weight of 1000–2000.

13. The process of claim 9, wherein the foam has a ratio of the Young's storage modulus E' at −100° C. over the Young's storage modulus at +25° C. of more than 15.

14. The process of claim 10, wherein the foam has a ratio of the Young's storage modulus E' at −100° C. over the Young's storage modulus at +25° C. of more than 15.

15. A flexible polyurethane foam comprising in situ formed particulate material comprising urea and urethane groups.

16. A flexible polyurethane foam comprising particulate material, which material fractures by tearing the foam.

17. The flexible polyurethane foam of claim 15, wherein the particulate material has an average particle size of 2–20 $\mu$m.

18. The flexible polyurethane foam of claim 16, wherein the particulate material has an average particle size of 2–20 $\mu$m, comprises urea and urethane groups, and which particulate material has been formed in situ.

19. The flexible polyurethane foam of claim 17, wherein the average particle size is 3–10 $\mu$m.

20. The flexible polyurethane foam of claim 18, wherein the average particle size is 3–10 $\mu$m.

21. The flexible polyurethane foam of claim 17, wherein the foam comprises 20–45% by weight of benzene groups.

22. The flexible polyurethane foam of claim 18, wherein the foam comprises 20–45% by weight of benzene groups.

23. The flexible polyurethane foam of claim 17, wherein the foam comprises 25–40% by weight of benzene groups.

24. The flexible polyurethane foam of claim 18, wherein the foam comprises 25–40% by weight of benzene groups.

25. The flexible polyurethane foam of claim 17, wherein the foam has a free rise core density of 5–80 kg/m$^3$.

26. The flexible polyurethane foam of claim 18, wherein the foam has a free rise core density of 5–80 kg/m$^3$.

27. The flexible polyurethane foam of claim 17, wherein the foam has a free rise core density of 6–50 kg/m$^3$.

28. The flexible polyurethane foam of claim 18, wherein the foam has a free rise core density of 6–50 kg/m$^3$.

29. The flexible polyurethane foam of claim 17, wherein the foam has a free rise core density of 8–35 kg/m$^3$.

30. The flexible polyurethane foam of claim 18, wherein the foam has a free rise core density of 8–35 kg/m$^3$.

31. The flexible polyurethane foam of claim 17 comprising at least 10% v of particulate material based on the volume of the solid part of the foam.

32. The flexible polyurethane foam of claim 18 comprising at least 10% v of particulate material based on the volume of the solid part of the foam.

* * * * *